United States Patent
Reynolds

(10) Patent No.: US 10,181,872 B1
(45) Date of Patent: Jan. 15, 2019

(54) IMPULSE RESPONSE FILTERING OF CODE DIVISION MULTIPLEXED SIGNALS IN A CAPACITIVE SENSING DEVICE

(71) Applicant: SYNAPTICS INCORPORATED, San Jose, CA (US)

(72) Inventor: Joseph Kurth Reynolds, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/657,047

(22) Filed: Jul. 21, 2017

(51) Int. Cl.
*H04B 1/7097* (2011.01)
*H04L 25/03* (2006.01)
*H04J 13/00* (2011.01)

(52) U.S. Cl.
CPC ........ *H04B 1/7097* (2013.01); *H04J 13/0077* (2013.01); *H04L 25/03261* (2013.01); *H04B 2201/709709* (2013.01)

(58) Field of Classification Search
CPC ......... H04L 25/03248; H04L 25/03318; H04L 25/03006; H04L 25/03261; H04J 13/0077; H04B 1/7097; H04B 2201/709709; G06F 3/044; G06F 2203/04108; G06F 3/0416; G02F 1/13338
See application file for complete search history.

(56) References Cited

U.S. PATENT DOCUMENTS

| | | | |
|---|---|---|---|
| 6,212,174 B1 | 4/2001 | Lomp et al. | |
| 7,450,906 B2 | 11/2008 | Choi et al. | |
| 8,868,093 B1 | 10/2014 | Gauba et al. | |
| 9,274,659 B2 | 3/2016 | Tanemura et al. | |
| 2006/0245477 A1* | 11/2006 | Yoshida | H04B 1/7097 375/148 |
| 2007/0127588 A1* | 6/2007 | Kim | H04B 7/04 375/267 |
| 2011/0210939 A1 | 9/2011 | Reynolds et al. | |
| 2011/0210940 A1 | 9/2011 | Reynolds | |
| 2012/0013546 A1* | 1/2012 | Westhues | G06F 3/044 345/173 |
| 2012/0013565 A1* | 1/2012 | Westhues | G06F 3/0418 345/174 |
| 2012/0262222 A1* | 10/2012 | Schwartz | G06F 3/0418 327/517 |
| 2014/0049507 A1 | 2/2014 | Shepelev et al. | |
| 2017/0168604 A1* | 6/2017 | Schwartz | G06F 3/044 |

* cited by examiner

*Primary Examiner* — Khanh C Tran

(74) *Attorney, Agent, or Firm* — Patterson + Sheridan, LLP

(57) ABSTRACT

An example method of capacitive sensing includes: receiving at least one code division multiplexed (CDM) signal transmitted from different transmitters using different codes over a plurality of signal bursts, wherein a length of each of the different codes is equal to or greater than a number of the different transmitters; filtering the at least one CDM signal using an impulse response filter, wherein the filtering comprises: accumulating the at least one CDM signal over the plurality of signal bursts to obtain measurements of the at least one CDM signal; and for the measurements of the at least one CDM signal, applying different filter weights to the resulting signals over a number of the plurality of signal bursts that is greater than the length of the different codes.

20 Claims, 6 Drawing Sheets

IMPULSE RESPONSE FILTERING OF CODE DIVISION MULTIPLEXED SIGNALS IN A CAPACITIVE SENSING DEVICE

BACKGROUND

Field of the Disclosure

Embodiments of disclosure generally relate to capacitive sensors and, more particularly, impulse response filtering of code division multiplexed (CDM) signals in a capacitive sensing device.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

This disclosure generally provides input devices, processing systems, and methods for impulse response filtering of code division multiplexed (CDM) signals.

In an embodiment, a method for digital signal processing (DSP) includes: receiving at least one CDM signal from different transmitters using different codes over a plurality of signal bursts, wherein a length of each of the different codes is equal to or greater than a number of the different transmitters; filtering the at least one CDM signal using an impulse response filter, wherein the filtering comprises: accumulating of the at least one CDM signal over the plurality of signal bursts to obtain measurements of the at least one CDM signal; and for the measurements of the at least one CDM signal, applying different filter weights to the resulting signals over a number of the plurality of signal bursts that is greater than the length of the different codes (e.g., to compute a filtered report using the at least one filter weighted measurements that overlaps with a prior measurement in a computed report such as one used to report user input or affect the user interface).

In another embodiment, a processing system for an input device includes: sensor circuitry configured to: receive at least one CDM signal transmitted from different transmitter electrodes using different codes over a plurality of signal bursts, wherein a length of each of the different codes is equal to or greater than a number of the different transmitters; and a processing module, coupled to the sensor circuitry, configured to: filter the at least one CDM signal using an impulse response filter, wherein the filtering comprises: accumulating the at least one CDM signal over the plurality of signal bursts to obtain measurements of the at least one CDM signal; and for the measurements of the at least one CDM signal, applying different filter weights to the resulting signals over a number of the plurality of signal bursts that is greater than the length of the different codes.

In another embodiment, an input device includes: a plurality of sensor electrodes comprising a plurality of transmitter electrodes and a plurality of receiver electrodes, wherein the plurality of receiver electrodes are configured to receive at least one CDM signal transmitted from different transmitter electrodes of the plurality of transmitter electrodes using different codes over a plurality of signal bursts, wherein a length of each of the different codes is equal to or greater than a number of the different transmitter electrodes; and a processing system coupled to the plurality of sensor electrodes, the processing system configured to: filter the at least one CDM signal using an input response filter, wherein the filtering comprises: accumulating the at least one CDM signal over the plurality of signal bursts to obtain measurements of the at least one CDM signal; and for the measurements of the at least one CDM signal, applying different filter weights to the resulting signals over a number of the plurality of signal bursts that is greater than the length of the different codes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
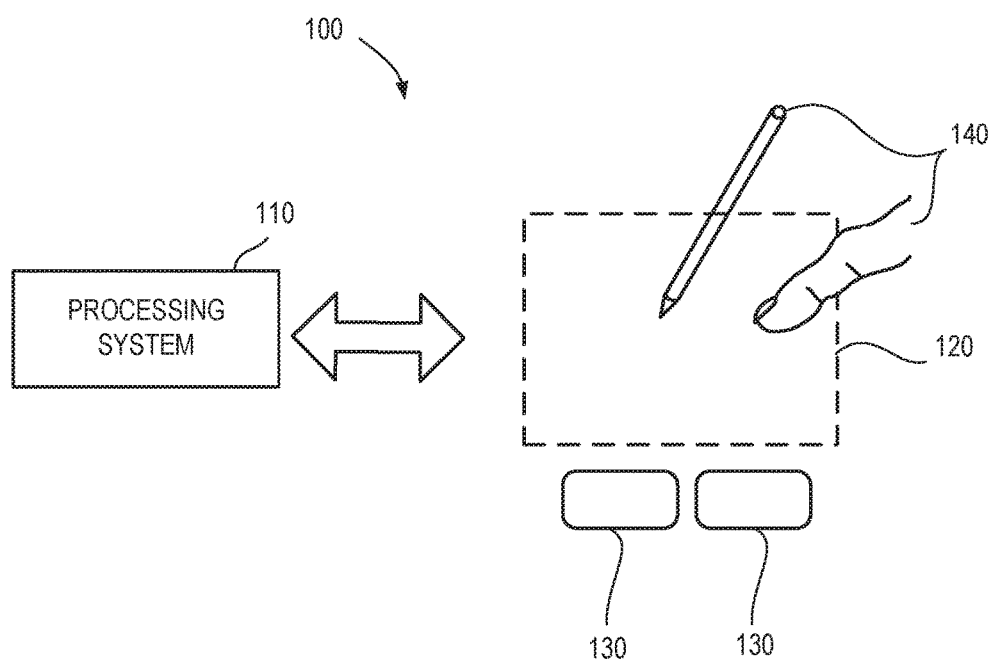
FIG. 1 is a block diagram of an exemplary input device, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Typically, for code division multiplexing (CDM), an input device includes receiver electrodes that receive CDM signals transmitted from different transmitter electrodes using different codes over a number of signal bursts. A length of the codes can be equal to or greater the number of different transmitter electrodes. The input device filters the CDM signal using a boxcar filter by accumulating the CDM signal to obtain measurements of the CDM signal and applies the same filter weights to compute a report (e.g., to report user input position) by decoding the measurements at the non-overlapping period of the code repeat rate. A report can be sent at the end a filter period, which in this case would be equal to the code repeat rate.

Aspects of the present disclosure provide for CDM signals that can be from multiple different transmitters (e.g., different transmitter electrodes). In some cases, multiple receivers can be used (e.g., different receiver electrodes). The code used by the transmitters for the CDM signal can be as long, or longer, than the number of transmitters being measured, and the code can be repeated during transmission. Aspects of the present disclosure provide for filtering/decoding of the CDM results using an impulse response filter that applies different filter weights for different bursts. The filter can be overlapping (e.g., longer than the length of the code). The total filter weighting of the different codes can be equal.

An FIR filter has a finite response because there are multiple discrete time samples in it, and it has a finite response period to a single impulse. An FIR filter is inherently time-domain, having individual steps in it. An FIR filter may be convolved in the time domain with the measured signal and noise/interference. The impulse response of an FIR filter may be represented by a transfer function showing response to a Kronecker-delta (e.g., single discrete time impulse) input before settling to zero in a finite time. An infinite impulse response (IIR) filter has an infinite impulse response and recursive feedback, though the response may fall exponentially. The impulse response of a IIR filter (e.g., a discrete time switched capacitor) may be similar the response of an FIR filter when there are negligible non-zero weightings in the filters (e.g., smaller than quantization or kT/C noise) where the weighted results are within rounding error of the two filter types.

As utilized herein, capacitive sensing is described as a touch sensing technique utilizing information received from capacitive sensor electrodes at least some of which may be combination electrodes, while force sensing is described as utilizing information received from force sensor electrodes to determine force that an input object exerts against the input device.

Some input devices may be configured for touch sensing. Touch sensing may be performed by driving one or multiple sensor electrodes of the input device with a modulating signal and receiving resulting signals (e.g., ADC converted) having effects indicating changes in capacitance of the sensor electrodes. The spatially separate transmitters may each transmit a carrier convolved with a substantially orthogonal code to allow decoding (e.g. deconvolution) of spatially independent transmitter signals. The changes in capacitance can be used to determine a position of an input object. Typically, touch controllers demodulate the signal(s) from the sensor electrodes using single phase demodulation (e.g. homodyne detection). In some cases, touch controllers demodulate the signal(s) from the sensor electrodes using quadrature phase demodulation (e.g., single side band or heterodyne detection).

Signals (e.g., waveforms) may be transmitted simultaneously with multiple coded transmitters, for example, using (CDM). The codes may use 180 degree phase shifting or binary phase shift keying (BPSK) coding. Typically, the CDM (of length n) signals are accumulated over time (e.g., over multiple signal bursts). The accumulated demodulated signals can be equally weighted thus equally weighting their convolved codes, for example, using a boxcar filter (i.e., with equal weightings), and a single independent report can be outputted/reported (e.g., filtered measurement results) at the period of the code length and filter period. A boxcar filter is a filter that uses a uniform moving average according to a rectangular "boxcar" function as the impulse response of the filter. Deconvolution of the equally weighted measurements may be an inverse transpose matrix. Each n signal bursts (i.e., unique transmitter configurations or ADC conversions) may give an independent measurement (e.g., with weights of the sequential result non-overlapping with non-zero weights of the prior report filter).

However, according to certain aspects, the measurements can be weighted differently (e.g., different filter weights applied to different measurements), even though each code phase (i.e., out of n phases) may still be weighted equally in the accumulated report longer than the code. For example, a triangle FIR filter may be used. The measurements can be filtered over roughly twice the length of the code (e.g., 2n or 2n−1 bursts), where each code phase is weighted equally in the sum, and the code is repeated at least once. Overlapping weightings refer to those that are non-zero (e.g., not before or after the effective beginning or end of the impulse response of the filter). Each filtered measurement result may be a narrow bandwidth measurement (e.g., low or band passed after demodulation and/or decoding) to allow ADC measurements at a rate less than 2 to 4 times the carrier frequency (e.g. limited by Nyquist). According to certain aspects, a series of code-demodulated signals may be accumulated into overlapping filters, allowing for higher report rates (e.g., up to the burst rate or measurement rate). Triangle weighted (i.e. higher order) filters have the advantage of reduced correlation between sequential reports of partially overlapping result weights.

FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images of user input coupling for determining positional information that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects. For "absolute capacitance" sensors the receiver demodulation may be CDM encoded rather than the transmitter (e.g. all of the measured sensors may use the same transmitter waveform and guard each other to reduce the required dynamic range). This receiver CDM allows for higher signal to noise ratio with a reduced number of simultaneous ADC measurements. Note that for receiver CDM multiple electrodes with the same modulation may be multiplexed to a single receiver which demodulates and decodes the combined signal.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like. The processing system 110 may allow measurements of external interference (e.g., without transmitter modulation). The processing system 110 may also enter a low power mode when there is a lack of user input over a period of time (e.g. with a reduced report rate or reduced number of bursts per report).

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. The buttons 130 may sense by resistive mechanical switch, force sensing foam, and/or capacitive means. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes (e.g. metal mesh, Indium Tin Oxide, Silver Nano-wires, etc.) overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
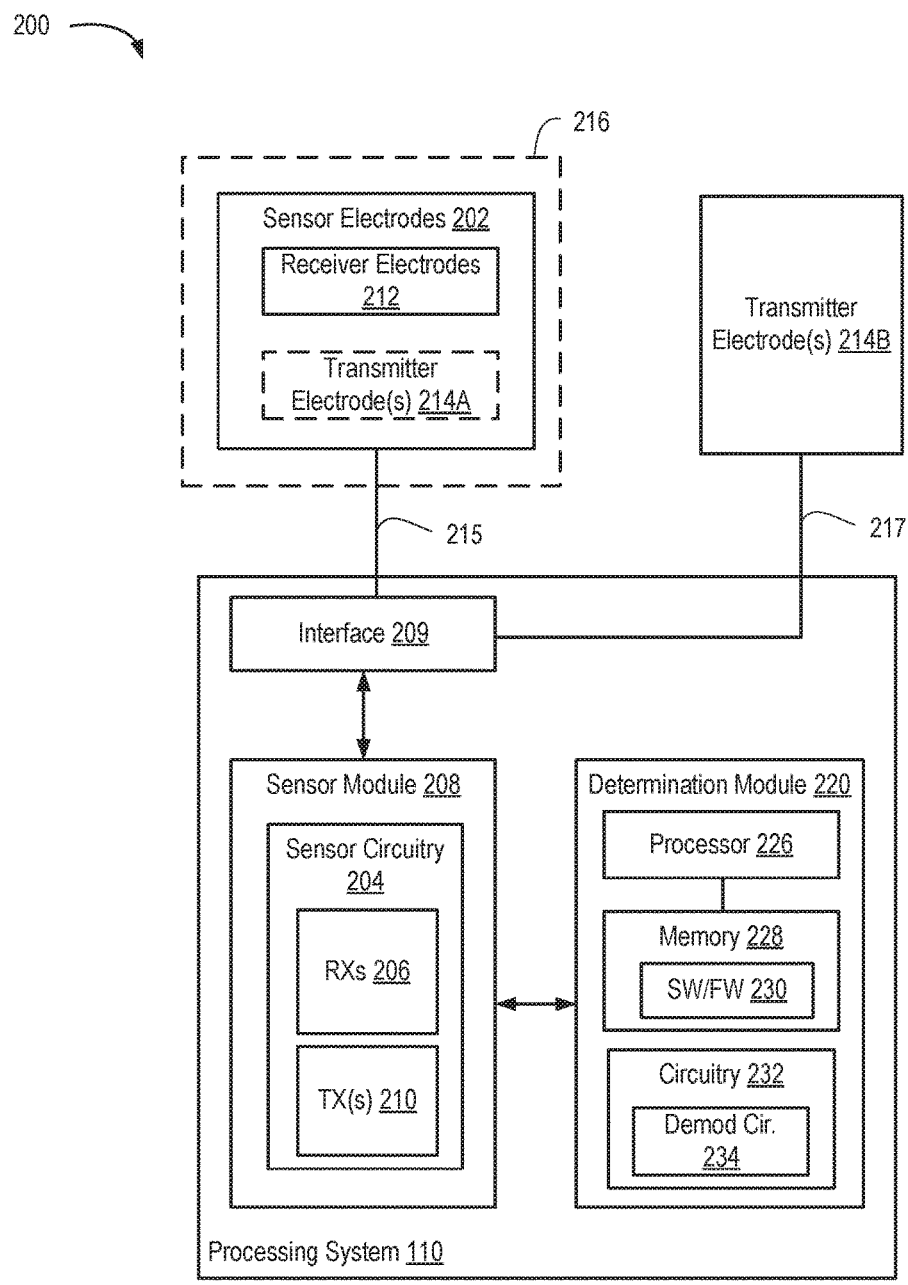
FIG. 2 is a block diagram depicting a capacitive sensing device of the input device of FIG. 1 according to some embodiments.

FIG. 2 is a block diagram depicting a capacitive sensing device 200 of the input device 100 according to some embodiments. The capacitive sensing device 200 includes a plurality of sensor electrodes 202. The sensor electrodes 202 are disposed in the sensing region 120 of the input device 100 (FIG. 1) and can be arranged in various patterns, such as an area filling diamond pattern, a structurally similar bars and stripes crossing pattern, a fully connected matrix pattern, or the like. During transcapacitive sensing, the sensor electrodes 202 include a plurality of receiver electrodes 212. In some embodiments, the sensor electrodes 202 include one or more transmitter electrodes 214A. In other embodiments, the capacitive sensing device 200 can include one or more transmitter electrodes 214B separate from the sensor electrodes 202. The sensor electrodes 202 are coupled to the processing system 110 through routing traces 215. If present, the transmitter electrode(s) 214B is/are coupled to the processing system 110 by electrical connection(s) 217. The transmitter electrode(s) 214A and the transmitter electrode(s) 214B are generally referred to as transmitter electrode(s) 214, although they may also provide a guarding or anti-guarding (i.e., 180 degrees out of phase from a guard) functionality.

The sensor electrodes 202 can be formed on one or more substrates 216. In some touch screen embodiments, all or a portion of the sensor electrodes 202 are display electrodes of a display panel used in updating a display, such as one or more segments of a "Vcom" electrode (common electrodes), gate electrodes, source electrodes, anode electrode and/or cathode electrode. These display electrodes may be disposed on an appropriate display screen substrate. For example, the display electrodes may be disposed on a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-Domain Vertical Alignment (MVA)), over an emissive layer (OLED), etc. The display electrodes can also be referred to as "cathode electrodes" or "common electrodes," since the display electrodes perform functions of display updating and capacitive sensing.

The receiver electrodes 212 form areas of localized capacitive couplings with the transmitter electrode(s) 214 referred to as transcapacitances. The transcapacitances form "capacitive pixels" of a "capacitive image" (also referred to as a "capacitive frame"). The transcapacitances between the receiver electrodes 212 and the transmitter electrode(s) 214 change with the proximity and motion of input object(s) in the sensing region 120 (i.e., the capacitive pixel values can change from one capacitive image to the next based on presence of input object(s)). Similarly, absolute capacitive sensor electrodes may have localized couplings to the user input through a face sheet or display lens, and form an array of "capacitive pixels".

In an embodiment, the processing system 110 includes a sensor module 208 and a determination module 220. The sensor module 208 includes sensor circuitry 204 that operates the sensor electrodes 202 to receive resulting signals. The sensor module 208 is coupled to the sensor electrodes 202 and the transmitter electrode(s) 214B (if present) through an interface 209. The interface 209 can include various switches, multiplexers, and the like that couple the sensor circuitry 204 to the sensor electrodes 202 and the transmitter electrode(s) 214B (if present). The sensor circuitry 204 can include a plurality of receivers (RXs) 206 and one or more transmitters (TX(s)) 210. The transmitter(s) 210 are configured to couple modulated signal(s) to the transmitter electrodes 214 through the interface 209. The spatially separate transmitters may each transmit a narrow band carrier, which modulates the signal voltages, and that carrier may in turn be convolved with an additional modulating waveform (e.g. a phase, frequency, or code modulation). The receivers 206 are configured to receive resulting signals from the receiver electrodes 212 and the demodulation circuitry 234 in turn demodulates and filters those signals.

The determination module 220 is coupled to the sensor module 208. The determination module 220 is configured to determine capacitive measurements from the resulting signals received by the sensor circuitry 204. The determination module 220 can also determine position information for input object(s) from the capacitive measurements. In an embodiment, the determination module 220 includes processor circuitry 226, such as a digital signal processor (DSP), microprocessor, or the like. The determination module 220 can include memory 228 configured to store software and/or firmware (SW/FW 230) configured for execution by processor circuitry 226 to implement various functions. Alternatively, some or all of the functions of the determination module 220 can be implemented entirely in hardware (e.g., using circuitry 232). Similarly, for digital demodulation systems some of the demodulation may take place in firmware. The processing system 110 can include other modular configurations, and the functions performed by the sensor module 208 and the determination module 220 can, in general, be performed by one or more modules or circuits in the processing system 110. In an embodiment, the circuitry 232 includes demodulation circuitry 234. The demodulation circuitry 234 demodulates and filters the resulting signals received by the sensor circuitry 204. The demodulation circuitry 234 is discussed further below.

In an embodiment, the processing system 110 comprises a single integrated controller, such as an application specific integrated circuit (ASIC), having the sensor module 208, the determination module 220, and any other module(s) and/or circuit(s). In another embodiment, the processing system 110 can include a plurality of integrated circuits, where the sensor module 208, the determination module 220, and any other module(s) and/or circuit(s) can be divided among the integrated circuits. For example, the sensor module 208 can be on one integrated circuit, and the determination module 220 and any other module(s) and/circuit(s) can be one or more other integrated circuits. In some embodiments, a first portion of the sensor module 208 can be on one integrated circuit and a second portion of the sensor module 208 can be on second integrated circuit. In such embodiments, at least one of the first and second integrated circuits comprises at least portions of other modules, such as a display driver module.

As will be described in more detail below, the transmitter(s) 210 may transmit code division multiplexed (CDM) signals using the transmitter electrodes 214 to be received at the receiver electrodes 212. Alternately, the receiver inputs may be multiplexed by CDM codes to reduce the amount of simultaneously active receiver electronics. The demodulation circuitry 234 may provide demodulated narrow band measurement to the filter for the resulting (e.g., decoded or deconvolved) signals, received by the sensor circuitry 204, using impulse response filtering techniques described herein, in more detail further below.

Figure 3:
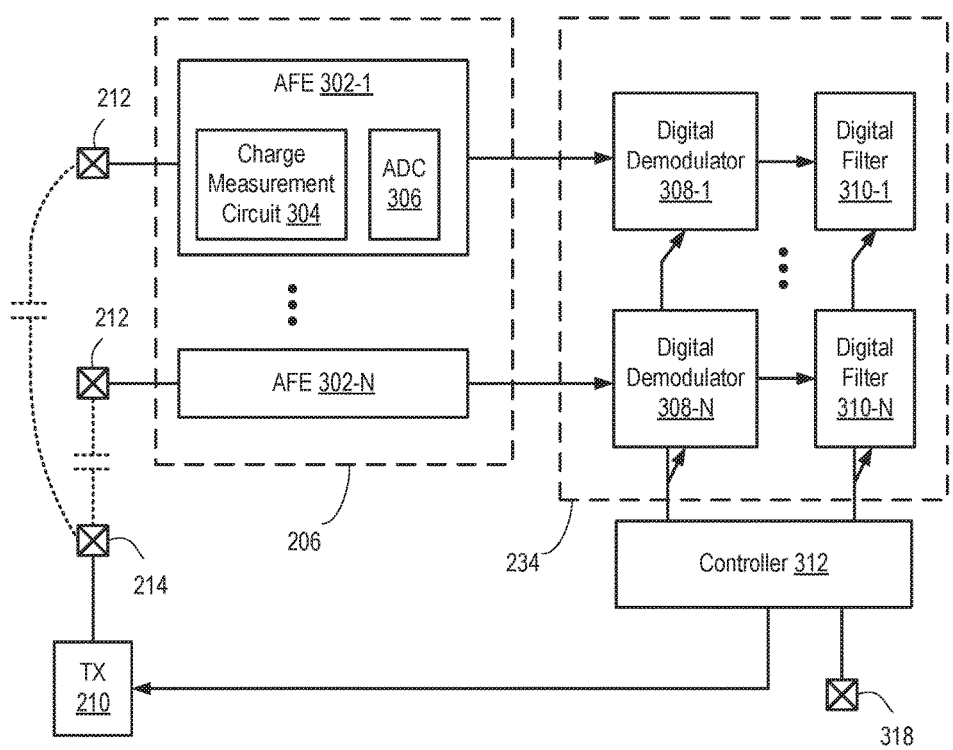
FIG. 3 is a block diagram depicting a portion of the processing system in more detail according to an embodiment.

FIG. 3 is a block diagram depicting a portion of the processing system 110 in more detail according to an embodiment. In the embodiment, the one or more receiver(s) 206 include analog front ends (AFEs) 302-1 through 302-N (collectively AFEs 302), where N is an integer greater than zero. Each AFE 302 includes a charge measurement circuit 304 and an analog-to-digital converter (ADC) 306 (only one AFE 302-1 is shown in detail for purposes of clarity). The charge measurement circuit 304 in each AFE 302 is electrically coupled to one or more receiver electrodes (e.g., a receiver electrode 212). A transmitter 210 is electrically coupled to a transmitter electrode 214. The transmitter electrode 214 is capacitively coupled to the receiver electrodes 212 as shown. The processing system 110 is connected to a reference voltage such as system ground 318 (e.g. through Controller 312) and thus coupled to free space (e.g. Earth ground) and any user input. Thus any user input near the input sensing region 120 will affect the charge coupling from transmitter electrode(s) 214 to receiver electrode(s) 212 due to relative modulation voltages and changing capacitances. The transmitter electrode 214 couples a transmitter signal to the transmitter electrode 212, which is capacitively coupled to the receiver electrodes 212. Although only a single transmitter 210 and transmitter electrode 214 are shown in the embodiment, the system can include multiple transmitters 210 and transmitter electrodes 214. Similarly, the charge measurement circuit 304 is shown as single ended, but it may have differential inputs where multiple receiver electrodes are multiplexed together by interface 209.

The charge measurement circuit 304 can be a charge integration circuit, contain a low input impedance current conveyer, or the like that is configured to measure a change in capacitive charge on the receiver electrode(s) 212 due to coupled modulation and/or interference. The charge measurement circuit 304 outputs an analog signal indicative of capacitive charge. The ADC 306 converts the analog signal output by the charge measurement circuit 304 into a digital signal. The ADC 306 outputs the digital signal (i.e., a resulting signal) for processing by the demodulation circuitry 234.

The demodulation circuitry 234 includes digital demodulators 308-1 through 308-N (collectively referred to as digital demodulators 308) and digital filters 310-1 through 310-N (collectively referred to as digital filters 310). Each digital demodulator 308 receives a resulting signal from a respective AFE 302. Each digital demodulator 308 is configured to combine a resulting signal with a selected demodulating signal to generate a demodulated signal. Note that although a modulated carrier and the local oscillator for I and Q demodulation signals may be synchronous and phase locked, they may also be optimally delayed for any delays in the coupled signals caused the sensor or environment (e.g. RC delays). The optimization maximizes the signal from the intended transmitted waveform into one result (e.g. I) while minimizing the signal from any other independent waveform simultaneously transmitting (e.g. Q). The delay may be implemented directly by as a clock delay or indirectly by measuring the quadrature amplitude and phase of the signal to calculate a delay digitally. Each digital demodulator 308 can select among a plurality of demodulating signals that are independent from each other in terms of code. For example, each digital demodulator 308 can combine a resulting signal with an orthogonal code, for 180 degree out of phase, BPSK, Hadamard code, Barker code, in-phase (I) local oscillator (LO) signal or a quadrature (Q) LO signal to generate an I or Q demodulated signal. The I and Q LO signals are substantially orthogonal (e.g., ninety degrees out of phase) based on the narrowband signal model. The digital filters 310 filter the demodulated signals, which are processed by the determination module 220 to determine changes in capacitance and position information. The digital filters 310 can be impulse response filters, such as discrete time finite impulse response (FIR) filters, simulated infinite impulse response (IIR) filters, or like type digital filters.

As will be described in more detail below, the digital filters 310 may be second order filters, such as triangle FIR filters. The digital filters 310 may be configured to filter CDM signals by applying different filtering weights to the signals over a number of signal bursts. The coded CDM signals may repeat at least once. The digital filters 310 may apply the different filtering weights in a triangular pattern over a number of signal bursts (i.e., measurements of multiple carrier cycles convolved with a single code phase) that is greater than a length of the code n used for the CDM signals, for example, over 2n or 2n−1 signal bursts; however, the total weighting applied to each code over the plurality of signal burst may be equal. The CDM signals may use circulant codes, although they need not be sequential (e.g., the code phase between spatially neighboring electrodes may be chosen to minimize decoding artifacts due to user input motion or variable interference during sequential measurements). In one embodiment, the accumulated weights of similarly coded measurements are weighted similarly in the filter report to reduce biased interference performance (e.g., worse for a particular code phase).

According to certain aspects, by using a triangle filter, the filter may be approximately twice as long (e.g., with up to $1/\sqrt{2}$ uniform noise reduction and 2× interference reduction for a filter 2n or 2n−1 in length). After the first filtered results are accumulated (e.g. for a report), subsequent filtered independent results can be reported at up to the burst rate (e.g., each code phase). For a report rate, there may be an approximately 50% temporal filter overlap of sequential reports, but only an approximately 25% signal overlap. At double the report rate (relative to the code repeat rate), there may be a 75% filter overlap of sequential reports, but only a 50% signal overlap (e.g., improved report independence relative to a report of boxcar filtered results).

In some examples, the techniques described herein may be useful for filtering low frequency baseline measurements (e.g., when user input is not present), for filtering in a low power mode (e.g., a timeout or low rate detection period after sensing), and for filtering in an interference measurement mode (e.g., with the transmitter off).

Figure 4:
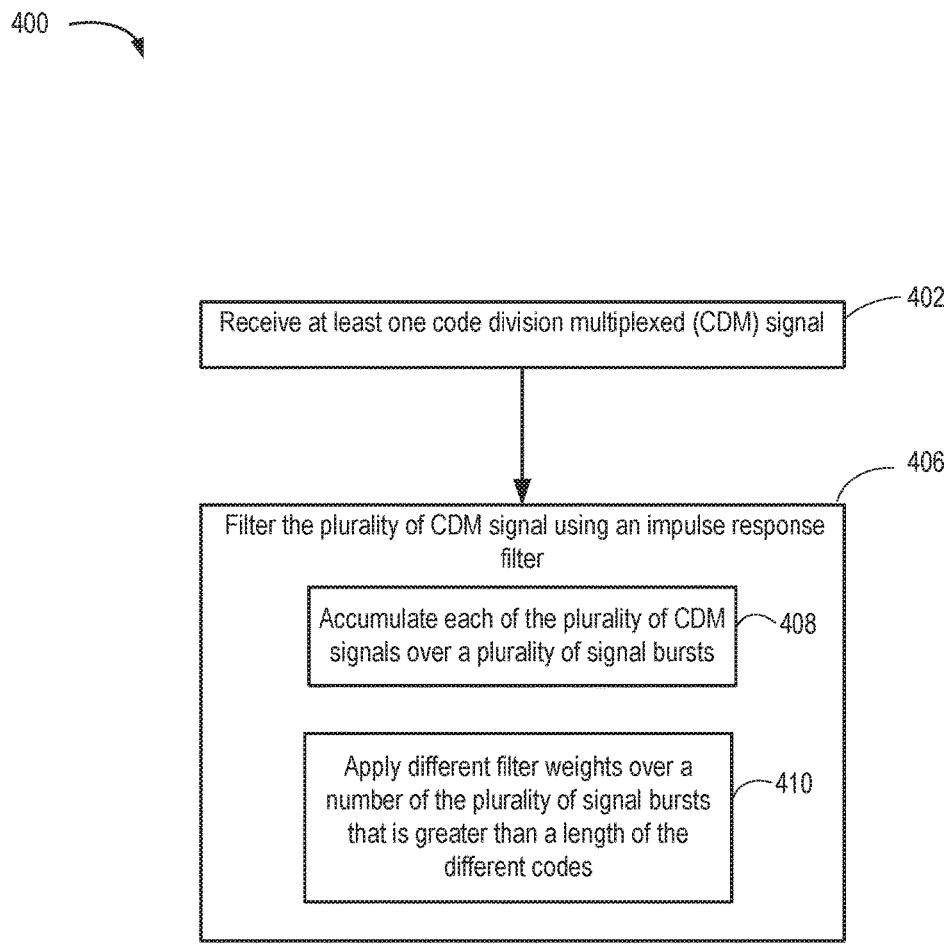
FIG. 4 is a flow diagram depicting a method of capacitive sensing according to an embodiment.

FIG. 4 is a flow diagram depicting a method 400 for digital signal processing (DSP) according to an embodiment. Aspects of the method 400 can be understood with reference to the capacitive sensing system 200 shown in FIGS. 2-3. For example, the method 400 for DSP may be used to process resulting CDM signals transmitted by multiple transmitter(s) 210. For example, the controller 312 controls the transmitter(s) 210 to transmit a plurality of transmitter waveforms and each transmitter waveform can be selected from a plurality of independent waveforms in terms of code. In an embodiment, each of a plurality of CDM signals are transmitted from a different transmitter 210 using a different code over a plurality of signal bursts. A length of each different code is equal to or greater than a number of the different transmitters 210 transmitting the CDM signals.

The method 400 begins at step 402, where the receivers 206 receive resulting CDM signals from receiver electrodes 212 over time (e.g., over a plurality of signal bursts). The resulting signals may indicate capacitive charge on the receiver electrodes 212 in response to capacitive coupling (e.g., transcapacitive) of the transmitter signal to the receiver electrodes 212 and the absence/presence of input object(s) in the sensing region 120. In the embodiment shown in FIG. 3, each AFE 302 generates a resulting signal using the charge measurement circuit 304 and the ADC 306.

According to certain aspects, the receivers 206 may receive the CDM signals by receiving the different codes sequentially from each transmitter (e.g., receive code 1 from transmitter 1, receive code 1 from transmitter 2, . . . etc.) or may receive all of the codes from one transmitter before receiving codes from another transmitter (e.g., receive code 1 from transmitter 1, receive code 2 from transmitter 1 . . . etc.). Alternately, the receivers 206 may receive CDM signals through interface 209 each multiplexed using a coded sequence to select a differential input for each of multiple receiver electrodes.

At step 408, the controller 312 controls the demodulation circuitry 234 to filter the resulting signals (e.g., the plurality of CDM signals) using an impulse response filter, such as an FIR or IIR filter. For example, the controller 312 controls the demodulation circuitry 234 to accumulate the resulting CDM signals over a plurality of signal bursts and may control the digital filter(s) 310 to apply different weights, to accumulated measurements, over a number of the plurality of signal bursts that is greater than (e.g., double) the length of the different codes applied to the separate transmitters. The code sequence may be repeated (i.e., at least n−1 total phases) to accumulate equal weighting of each code phase. The digital filter(s) 310 may apply the different filter weights to each measurement such that the total weighting applied to each different code is equal. For example, as will be described in more detail with respect to FIG. 5, the total weighting of each code phase may still sum to a value having a constant magnitude (e.g., a magnitude of 1) after normalization.

According to certain aspects, the controller 312 may control the demodulation circuitry 234 to filter the CDM signals using a boxcar FIR filter (e.g., weightings 502-1 or 502-6) for an initial (e.g., a threshold number) number of signal bursts, after which the controller 312 may control the demodulation circuitry 234 to filter the CDM signals by applying the different weightings according to a triangular FIR filtering (e.g. 502-2 or 502-3). For example, the first burst, or bursts with relatively low noise/interference could be reported simply with the boxcar FIR filter (e.g. with report period n) and following bursts also at the report period n, with overlapping filters (e.g. filter length 2n−1). In aspects, overlapping boxcar filters of the CDM results can be reported, or overlapping boxcar filters (e.g. length n) with a longer triangle filter (e.g. length 2n−1) can be reported sequentially to reduce latency. For example, an independent boxcar measurement can be performed and reported (e.g. after code phase n) until enough measurements have been performed for the 2n or 2n−1 triangular filter (e.g., starting at phase 2 and ending and phase 2n) for a constant report period (e.g. report period n bursts).

According to certain aspects, the controller 312 may control the demodulation circuitry 234 to filter the CDM signals using a sequence of FIR filters, for example, overlapping FIR filters. Separate reports may be given for each of the overlapping FIR filters. For example, in the example of a code (e.g., phases 1-2-3-4) repeated over signal bursts, by applying different sets of overlapping FIR filters, independent measurements of the coded sequences can be made, such as one measurement every burst (i.e., each transmitter configuration or ADC conversion result) and they may be reported every burst, every n bursts, or every 2n−1 bursts.

Figure 5:
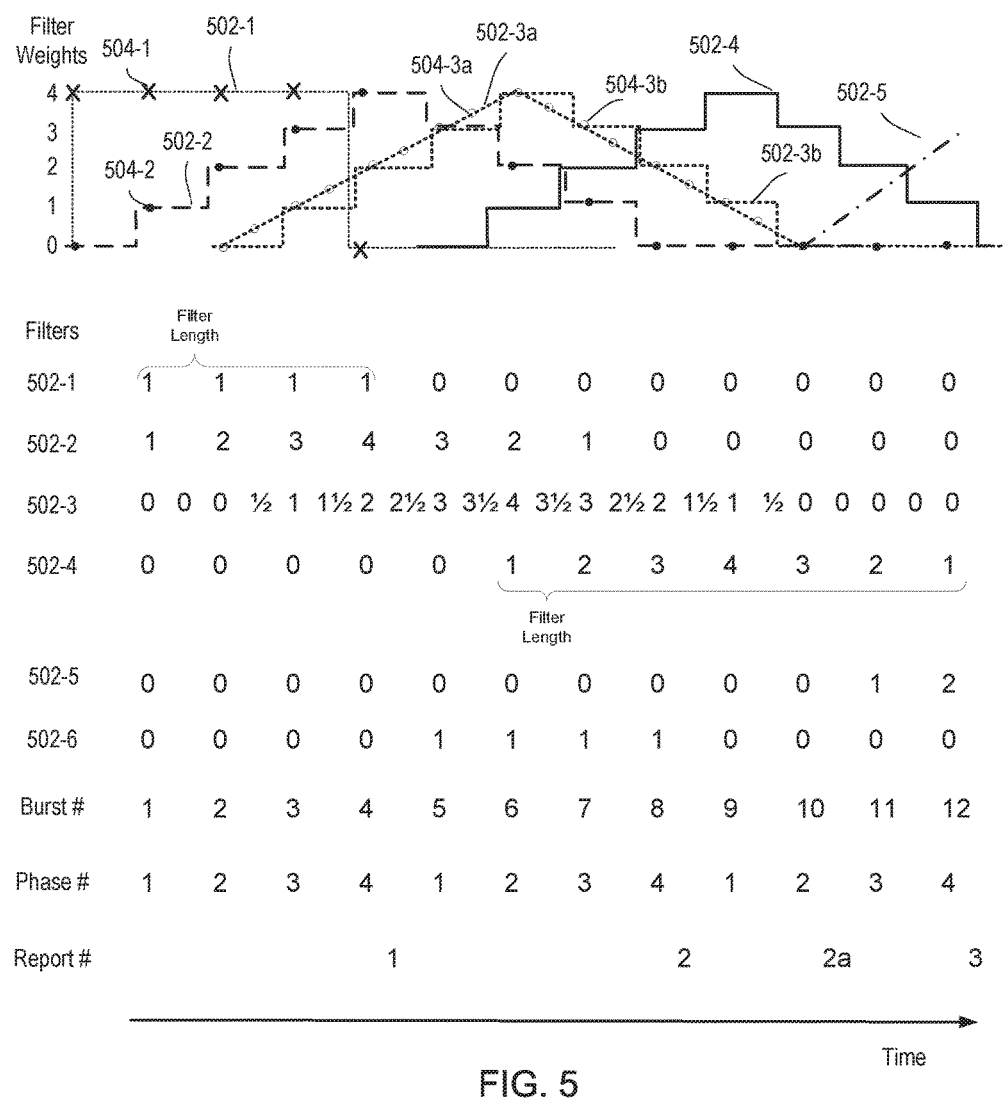
FIG. 5 is a graph that illustrates transmission and filtering of code division multiplexed (CDM) signals according to an embodiment.

The method 400 can be further understood with reference to the examples shown in FIG. 5. FIG. 5 is a graph that illustrates transmission and filtering of CDM signals using example CDM codes shown in FIG. 5A. Filters 502 show weighting that can be applied to the measurements, which may be taken at sample time 504. Filter 502-1 and filter 502-6 represent non-overlapping boxcar filters. Filters 502-2 and 502-4 represent overlapping triangle filters, and filter 502-5 represents a triangle filter non-overlapping with triangle filter 502-2. Filter 502-3 represents a filter with oversampling (e.g. where multiple results for each code phase are each weighted differently in the FIR filter).

Figure 5A:
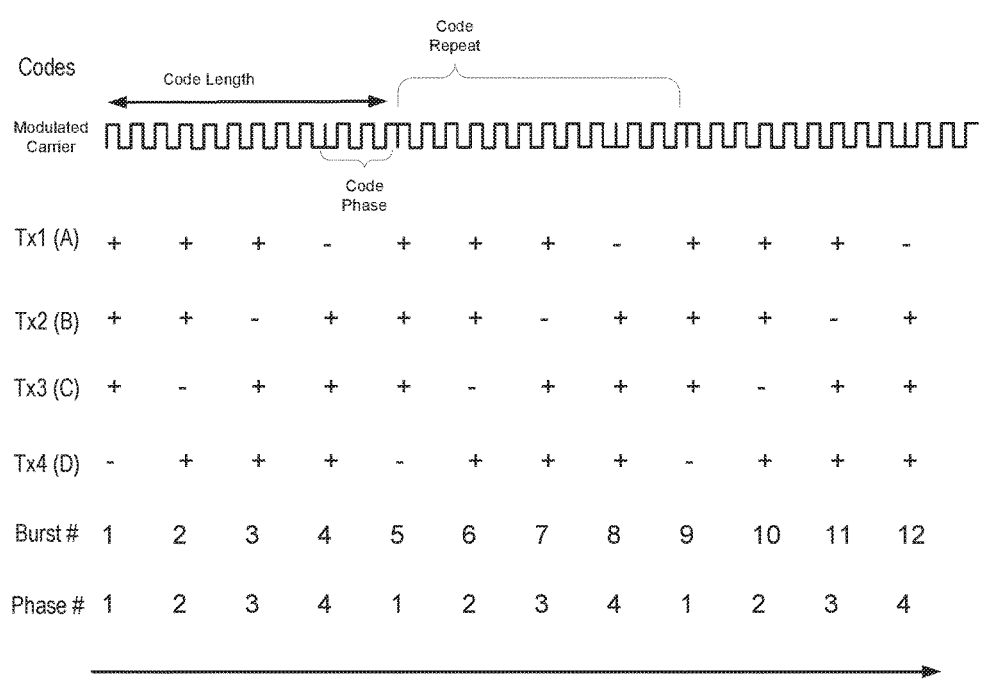
FIG. 5A shows example CDM code used for the transmissions of the CDM signals in FIG. 5 according to an embodiment.

As shown in FIG. 5A, four transmitters Tx1, Tx2, Tx3, and Tx4 transmit simultaneous CDM signals. The CDM signals may use circulant codes. Each code may be a phase shift (e.g., rotation) of the same code (e.g. A to B, C, or D).

Each code may be independently sensed as a resulting transcapacitive sensing signal from a receiver electrode. As shown in FIG. 5A, the transmitters transmit the CDM signals using a code having a length of 4 signal bursts. For example, Tx1 transmits the code A (+++−), Tx2 transmits the code B (++−+), Tx3 transmits the code C (+−++), and Tx4 transmits the code D (−+++). Although four transmitters are shown in FIG. 5A, any number of transmitters may transmit the CDM signals. The length n of the CDM codes may vary based on the number of transmitters. For example, the length of the CDM codes may be at least equal to the number of simultaneous transmitters, but equal to or less than the total number of transmitters.

In each signal burst, the transmitters transmit for a length of time (e.g., 10 or more cycles). The codes (e.g. ABDC) modulate a carrier (e.g. in phase, frequency, or amplitude). As shown in FIG. 5A, the code repeats throughout the transmission. The CDM signals from Tx1-Tx4 may be deconvolved at a receiver or multiple receivers. Received measurements (e.g., from charge measurement circuit 304) of the CDM signals are filtered (e.g., by digital filters 310). The CDM signals may be weighted using a FIR filter over at least 2n−1 signal bursts (e.g., not including the 0 weightings). For example, as shown in FIG. 5, for the length 4 CDM codes, the triangular FIR 502-2 applies different weightings over 7 signal bursts (e.g., burst #1-7).

As each burst of a CDM signal is gathered (e.g., received/measured), weighted portions may be accumulated into a number of image frames simultaneously. For example, 2-4 frames may be gathered simultaneously for full (2×) report rate of overlapping FIR filtered CDM results. As each phase of the FIR filters completes (e.g. accumulates triangle weighted results for each code equally) then each filtered frame could be image processed to generate touch reports (e.g., reports 1, 2, and 3 can use box car filter 502-1 and overlapping triangle filters 502-2 and 502-4, respectively). The filter weightings may be applied such that the total weighting applied to each CDM code is equal. Note that the filter weightings 502 may be applied at a discrete sampling time 504 for each filter. In some cases, different sampling times can be used. As shown in FIG. 5, the filter 502-3a uses a different sampling period 504-3a (e.g., also referred to as a measurement period) than the filter 502-3b using the less frequency sampling period 504-3b (e.g., an oversampling such that additional weightings may be present in 502-3 for additional available results). For example, for a Tx1 (code A), weightings of the code in the first four signal bursts (signal bursts #1-4) to deconvolve the signal may be ¼ (phase 1), ½ (phase 2), ¾ (phase 3), −1 (phase 4), and weightings of the code in the next four signal bursts (signal bursts #5-8) may be ¾ (phase 1), ½ (phase 2), ¼ (phase 3), and 0 (phase 4) may be applied over the signal bursts, such that the weighting for each phase of the code is constant (e.g., 1). For Tx2, the demodulation may be ¼, ½, −¾, 1, ¾, ½, −¼. In these examples, the magnitude/amplitude of the weightings applied to each code phase over the length of the triangle FIR filter sums to 1 or −1 (e.g., ¼+¾=1; ½+½=1; etc.).

In other examples, different lengths of FIR filters and CDM codes can be used, that satisfy a code of length n, an FIR filter of at least 2n or 2n−1, and triangular weightings that sum to an equal amplitude.

According to certain aspects, multiple measurements and independent measurements may be demodulated and filtered using overlapping FIR filters and codes. For example, as shown in FIG. 5, a different FIR filter can be performed shifted in phase by one or more signal bursts or code phases.

In other words, in an example, one FIR filter 502-2 can be used for a measurement of the CDM signal in bursts 1-7, another FIR filter 502-2 can be used for a measurement of the CDM signal in bursts 2-9, and another FIR filter 502-4 can be used for a measurement of the CDM signal in bursts 6-12. Another FIR filter 502-5 can be used for an independent measurement of the CDM signal starting at burst 11. Thus, in one example, in the same 12 signal bursts, 4 filtered measurements of the CDM codes can be made and reported. In FIG. 5, Report 1 is associated with the box car filter 502-1, Report 2 is associated with the filter 502-2, filter 502-3 is associated with Report 2a with a different report period, and filter 502-4 is associated with Report 3. Each of the accumulated and filtered burst measurements may also be narrow bandwidth measurements (e.g., demodulated from a modulated carrier). In aspects, the report rate can be as high as the measurement rate (e.g., each burst, which may be 10 μs). Independent measurements can be obtained using an overlapping filter after at each code repetitions (e.g., after 4 bursts in this example). For example, there may be 25% independence between successive codes (in the example length 4 codes).

The weighting of the results can be very simple for the triangle FIR filter, since they are integer multiplies or adds of simple fractions and the accumulated results always have the same number weights accumulated. Thus, a single right shift is sufficient to keep the results in 16 bits.

FIG. 5 also shows example impulse responses 502-1, 502-2, 502-3, and 502-4 of overlapping FIR filters. While the example of FIG. 5 shows four overlapping FIR filters, it is to be understood that the technique can be employed with any number of overlapping FIR filters or non-overlapping filters (e.g. 502-2 and 502-5). While a second order frequency response triangle FIR filter is described in the examples, other types of digital filters or weightings can be employed.

According to certain aspects, weighted CDM FIR filtering may be used with longer codes (e.g. 16 CDM) since fewer chips (code sequences) can be used to complete substantially independent sequential touch frame images, which may otherwise limit the maximum interpolated report rate. Typically for shorter codes reused over larger areas all codes (e.g., Codes A-D) in a first area are measured and then all codes (e.g., Codes A-D) in a second area, a third, and a fourth area are measured (e.g., gathered, accumulated) so that the measurements are separated in time (e.g. Time Division Multiplexing). However, where a higher filtered report rate is desired, CDM measurements may be spatially interleaved (where each CDM burst covers the entire sensor) while overlapping filters are used to report so that the full frame for each code is captured quickly. For example, a code length of 16 may be used to but reported at a period of 14 bursts (or Code phases) with overlapping filters rather than using 16 non-overlapping burst of a length 4 filter. In this way both higher report rate and better interference performance can be realized.

The filtering techniques described herein may allow for better interference performance when there are two frames of CDM code results (measurements) available. The performance may be similar to the IIR filter, but with second order filtering and very simple integer math. It can also be used to provide higher interpolated report rates.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

I claim:

1. A method for digital signal processing (DSP), comprising:
    receiving at least one code division multiplexed (CDM) signal transmitted from different transmitters using different codes over a plurality of signal bursts, wherein a length of each of the different codes is equal to or greater than a number of the different transmitters; and
    filtering the at least one CDM signal using an impulse response filter, wherein the filtering comprises:
        accumulating the at least one CDM signal over the plurality of signal bursts to obtain measurements of the at least one CDM signal; and
        for the measurements of the at least one CDM signal, applying different filter weights over a number of the plurality of signal bursts that is greater than the length of the different codes.

2. The method of claim 1, wherein:
    the impulse response filter is a triangular finite impulse response (FIR) filter, and
    the different filter weights are applied according to a triangular pattern over the number of the plurality of signal bursts.

3. The method of claim 1, wherein:
    the length of each of the different codes is n signal bursts, and
    the number of the plurality of signal bursts over which the filter weights are applied is equal to 2n or 2n–1 signal bursts.

4. The method of claim 1, wherein:
    the different filter weights are applied such that a total weighting applied to each of the different codes is equal.

5. The method of claim 1, wherein:
    the different codes comprise circulant codes.

6. The method of claim 1, further comprising:
    filtering the plurality of CDM signals using a boxcar filter until a threshold number of the plurality of signal bursts have been received.

7. The method of claim 1, further comprising:
    applying overlapping filters for overlapping sets of signal bursts; and
    outputting reports for each of the overlapping filters.

8. The method of claim 1, wherein the different codes used for the at least one CDM signal repeats at least once.

9. A processing system for an input device, comprising:
    sensor circuitry configured to:
        receive at least one code division multiplexed (CDM) signal transmitted from different transmitter electrodes using different codes over a plurality of signal bursts, wherein a length of each of the different codes is equal to or greater than a number of the different transmitters; and
    a processing module, coupled to the sensor circuitry, configured to:
        filter the at least one CDM signal using an impulse response filter, wherein the filtering comprises:
            accumulating the at least one CDM signal over the plurality of signal bursts to obtain measurements of the at least one CDM signal; and for the measurements of the at least one CDM signal, applying different filter weights over a number of the plurality of signal bursts that is greater than the length of the different codes.

10. The processing system of claim 9, wherein the processing module is configured to:
filter the at least one CDM signal using a triangular finite impulse response (FIR) filter, and
apply the different filter weights according to a triangular pattern over the number of the plurality of signal bursts.

11. The processing system of claim 9, wherein:
the length of each of the different codes is n signal bursts, and
the processing module is configured to apply the filter weights over a number of the plurality of signal bursts equal to 2n or 2n−1 signal bursts.

12. The processing system of claim 9, wherein:
the processing module is configured to apply the different filter weights such that a total weighting applied to each of the different codes is equal.

13. The processing system of claim 9, wherein:
the different codes comprise circulant codes.

14. The processing system of claim 9, wherein the processing module is further configured to:
filter the at least one CDM signal using a boxcar filter until a threshold number of the plurality of signal bursts have been received.

15. An input device, comprising:
a plurality of sensor electrodes comprising a plurality of transmitter electrodes and a plurality of receiver electrodes, wherein the plurality of receiver electrodes are configured to receive at least one code division multiplexed (CDM) signal transmitted from different transmitter electrodes of the plurality of transmitter electrodes using different codes over a plurality of signal bursts, and wherein a length of each of the different codes is equal to or greater than a number of the different transmitter electrodes; and
a processing system coupled to the plurality of sensor electrodes, the processing system configured to:
filter the at least one CDM signal using an impulse response filter, wherein the filtering comprises:
accumulating the at least one CDM signal over the plurality of signal bursts to obtain measurements of the at least one CDM signal; and
for the measurements of the at least one CDM signal, applying different filter weights over a number of the plurality of signal bursts that is greater than the length of the different codes.

16. The input device of claim 15, wherein the processing system is configured to:
filter the at least one CDM signal using a triangular finite impulse response (FIR) filter, and
apply the different filter weights according to a triangular pattern over the number of signal bursts.

17. The input device of claim 15, wherein:
the length of each of the different codes is n signal bursts, and
the processing system is configured to apply the filter weights over a number of the plurality of signal bursts equal to 2n or 2n−1 signal bursts.

18. The input device of claim 15, wherein:
the processing system is configured to apply the different filter weights such that a total weighting applied to each of the different codes is equal.

19. The input device of claim 15, wherein:
the different codes comprise circulant codes.

20. The input device of claim 15, wherein the processing system is further configured to:
filter the at least one CDM signal using a boxcar filter until a threshold number of the plurality of signal bursts have been received.

* * * * *